Figure 1:
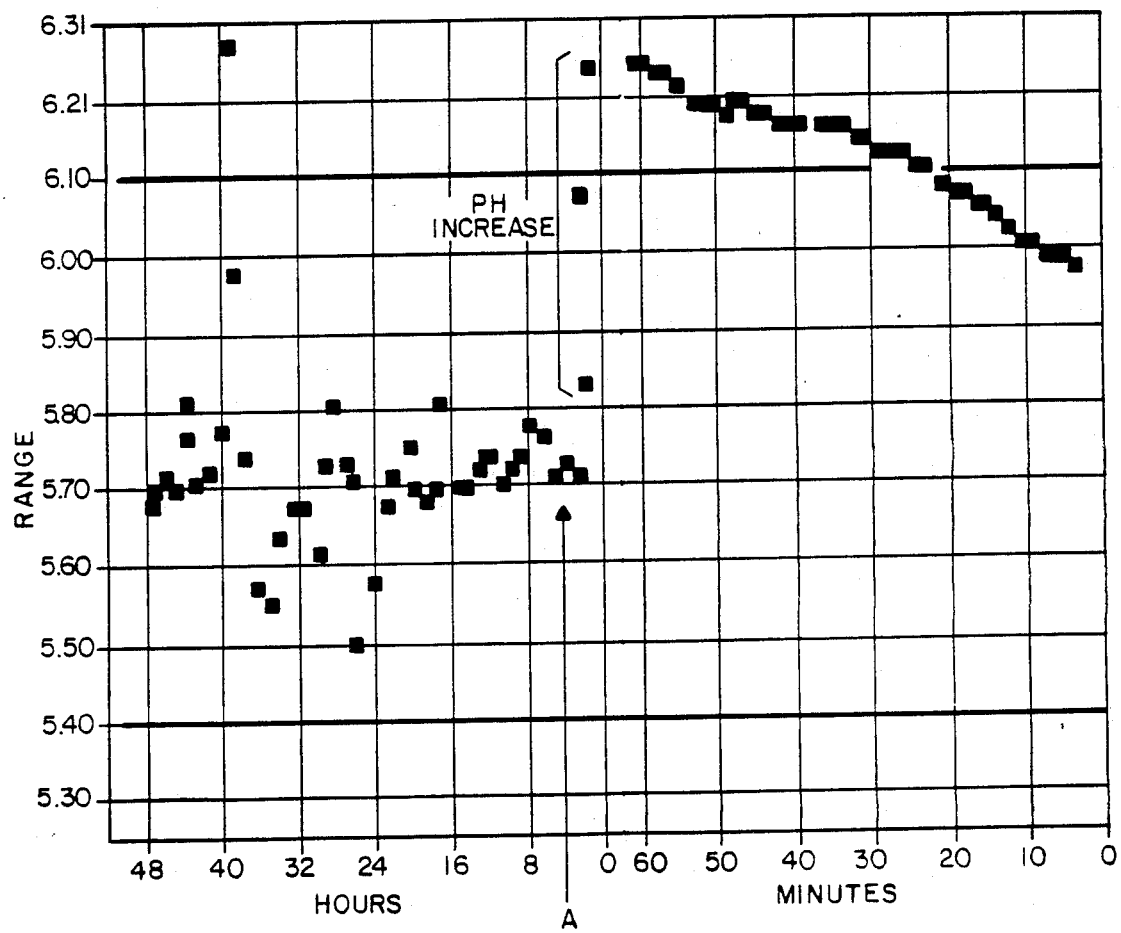

United States Patent [19]

Mouché et al.

[11] Patent Number: 4,869,846

[45] Date of Patent: Sep. 26, 1989

[54] FLY ASH UTILIZATION IN FLUE GAS DESULFURIZATION

[75] Inventors: Richard J. Mouché, Batavia; Mei-Jan L. Lin, Naperville, both of Ill.

[73] Assignee: Nalco Chemical Company, Naperville, Ill.

[21] Appl. No.: 180,655

[22] Filed: Mar. 28, 1988

Related U.S. Application Data

[63] Continuation of Ser. No. 882,337, Jul. 7, 1986, abandoned.

[51] Int. Cl.$^4$ ............................................. C09K 3/00
[52] U.S. Cl. ............................. 252/192; 106/DIG. 1; 264/DIG. 49
[58] Field of Search ................. 252/192; 106/DIG. 1; 264/DIG. 49

[56] References Cited

U.S. PATENT DOCUMENTS

2,358,157 9/1944 Gardner ........................ 106/DIG. 1
2,668,150 2/1954 Lavisi .
4,419,138 12/1983 Popovics ....................... 106/DIG. 1

OTHER PUBLICATIONS

Hawley, G. G., *The Condensed Chemical Dictionary*, van Nostrand Reinhold Co., N.Y., Ninth Edition, (1977), pp. 392, 446.
Carlton Johnson, "Flyash Removes SO$_2$ Effectively from Boiler Flue Gases", *Power Eng.*, vol. 83, #6, (1979), pp. 61-63.
Carlton A. Johnson, "Flyash Alkali Technology—Low Cost Flue Gas Desulfurization", 3rd International Coal Utilization Exhibition & Conference, Houston, TX, Nov. 18-20, pp. 568-588.
PEI Associates, Inc., "Flue Gas Desulfurization Inspection and Performance Evaluation Manual", EPA/625-/1-85/019, Oct. 1985, pp. 1-23.
Cathy Apple and Mary E. Kelly, "Mechanisms of Dry SO$_2$ Control Processes, EPA Project Summary", EPA-600/S7-82-026, Jun., 1982.
Harvey M. Ness, Franklin I. Honea, Everett A. Sondreal, and Philip Richmond, "Pilot Plant Scrubbing of SO$_2$ with Fly Ash Alkali from North Dakota Lignite", *Technol . . . Use Lignite* 1977, pp. 100-122.
John R. Green and Stanley E. Manahan, "Sulfur Dioxide Sorption by Humic Acid–Fly Ash Mixtures", *Fuel*, vol. 60, #4, (1981), pp. 330-334.
Harold I. Zeliger, "Powder from Western Coal: Fly Ash as a Reagent for SO$_2$ Scrubbing", *Conference Proceedings, Joint Conference on Sensing of Environmental Pollutants*, New Orleans, La., Nov. 6-11, 1977, pp. 159-161.
*Encyclopedia of Chemical Technology*, vol. 7, pp. 444-447, John Wiley and Sons, (Third Edition).
*The Condensed Chemical Dictionary*, p. 641, 8th Edition, Van Nostrand Reinhold Company, (1971), "Oil".

*Primary Examiner*—Matthew A. Thexton
*Attorney, Agent, or Firm*—John G. Premo; Anthony L. Cupoli; Donald G. Epple

[57] ABSTRACT

A carboxylic acid which has a pK$_a$ within the range of 2 to 7 and the ability to increase the effective alkalinity of fly ash for flue gas desulfurization. Carboxylic acid may be combined with adjuvants. Generally carboxylic acids with dispersant properties are preferred. Adjuvants which enhance the dispersant qualities of carboxylic acid are desirable.

8 Claims, 4 Drawing Sheets

SCRUB 7 RECYL SLURRY PH 5.94 PH

FLY ASH UTILIZATION IN FLUE GAS DESULFURIZATION

This is a continuation of copending application Ser. No. 882, 337, filed on July 7, 1986, now abandoned.

FIELD OF THE INVENTION

The invention relates to the field of flue gas desulfurization. More particularly, the invention concerns the enhancement of the availability of fly ash alkalinity for $SO_2$ removal from flue gas.

INTRODUCTION

In the United States, the sulfur dioxide emissions of coal powered electric utility units which are newly constructed, are limited to a maximum sulfur dioxide emission of 1.2 lbs. for every million BTU's of heat imput. The legistation for the preventon of significant deterioration of the environment in some cases also requires that the "best" available control technology (BACT) be utilized. BACT regulations may require even more stringent control of sulfur dioxide $SO_2$ emissions. For this reason, flue gas desulfurization (FGD) is of great concern to coal fired electric utilities.

Today, approximately 126 FGD systems are utilized. This represents about 16% of the domestic coal fired generating capacity. Most of this capacity utilizes wet slurry systems where the scrubbing agent is lime or limestone. Approximately 3% of the total capacity is controlled by dry flue gas desulfurization techniques. See Flue Gas Desulfurization Inspection and Performance Evaluation Manual, by PEI Associates, Inc. 11499 Chester Road, P.O. Box 46100, Cincinatti, Ohio 45246.

The current cost of complying with Federal Emissions standards is significant and may exceed 15% of the total capital cost of a coal fired power plant. Limestone flue gas desulfurization is one of the lowest cost technologies currently available for the reduction of $SO_2$ emission.

One method of further reducing the cost of flue gas desulfurization is to augment limestone feed with dicarboxylic acids in the form of adipic or dibasic acids. Dibasic acids act as buffers. As buffers they tend to increase the alkalinity at the liquid-gas and solid-gas interphases, thus facilitating $SO_2$ removal. In this manner these carboxylic acid additives lower limestone requirements for limestone scrubber systems.

Currently, the preferred method of reducing the cost of lime/limestone scrubber systems is to augment the lime/limestone with fly ash. Fly ash is naturally produced when coal is burned to generate power in a coal fired electric utility plant. This fly ash may be collected by electrostatic precipitation during the normal efforts to remove particulates from flue gas. The fly ash is used because it contains natural alkalinity such as the alkaline oxide of calcium and magnesium. The problem with fly ash is that only a portion of the alkalinity is usable for $SO_2$ removal. This is because fly ash is composed of other chemicals such $SiO_2$, $Al_2O_3$, and $Fe_2O_3$, which coat the natural alkalinity in the fly ash to prevent a total utilization of the fly ash alkalinity.

In any case, tremendous costs savings are effected when flue gas desulfurization is augmented with fly ash because the fly ash does not have to be purchased, it is produced in the power plant.

One of the problems of the utilization of this combination of chemicals in $SO_2$ systems is foam. This can be a serious problem becuase the level of scrubber slurry utilized is controlled frequently by automatic sensors. These sensors cannot differentiate between the foam and the scrubber slurry itself. Therefore, automated procedures can breakdown under foaming conditions. For this reason defoamers are often necessary.

One of the interesting side effects of some types of antifoam addition is an immediate increase in the pH of slurry recycled water. This phenomenon has been noted by treatment plant operators when slug feeding antifoams. Plant operators have suggested that the lime carried on top of the foam and the pH increase is caused when the lime drops from the foam bubbles into the slurry. Some operators have even believed that some foam was "whiter" than other foam because of unused lime in the foam. In any case, these pH spikes were considered as an anomaly.

This invention resides in the appreciation that the fly ash contains alkaline species which are not completely utilized due to slow dissolution in the slurry water; and that this alkalinity may be released, allowing faster solubilization or more complete solubilization of the alkali in the fly ash, while it is still in the vessel. This is important because we have found lime usage has been reduced by 50 percent or more due to this increased fly ash alkalinity utilization.

SUMMARY OF THE INVENTION

The invention resides in the utilization of a weak organic acid having a $pK_a$ of at least 2 for enhancing the release of alkalinity from aqueous suspensions of finely divided fly ash. The method comprises contacting the suspension with from 0.5 to 500 ppm of a carboxylic acid which has a $pK_a$ of at least 2 for a period of time sufficient to increase the alkalinity of the aqueous suspension. Preferably, the $pK_a$ will be less than 7. Thus, removal of $SO_2$ from flue gases is facilitated.

Although carboxylic acids which are not dispersants can be used, generally carboxylic acids with dispersant properties are preferred. Non-polar organic liquids acting as adjuvants which enhance dispersant qualities of carboxylic acid are desirable.

THE FIGURES

Figure 2:
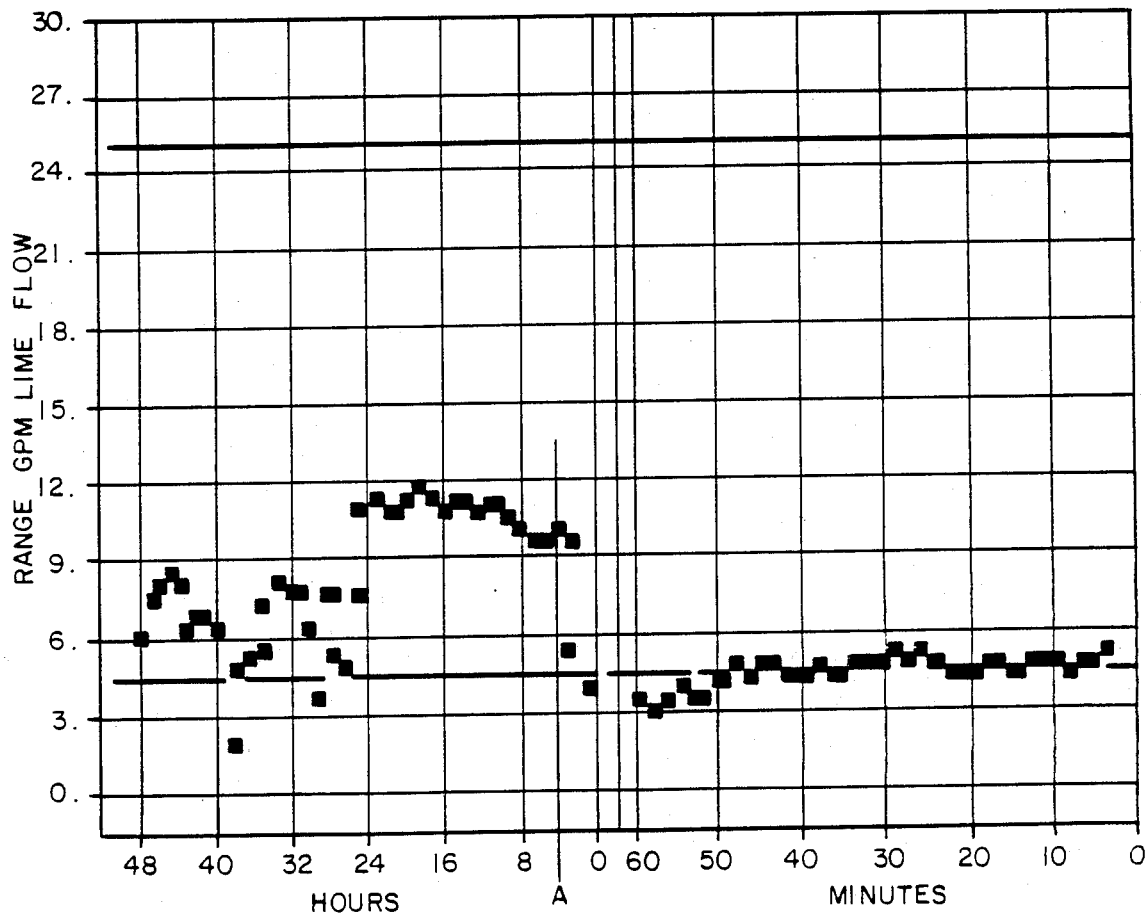
Figure 3:
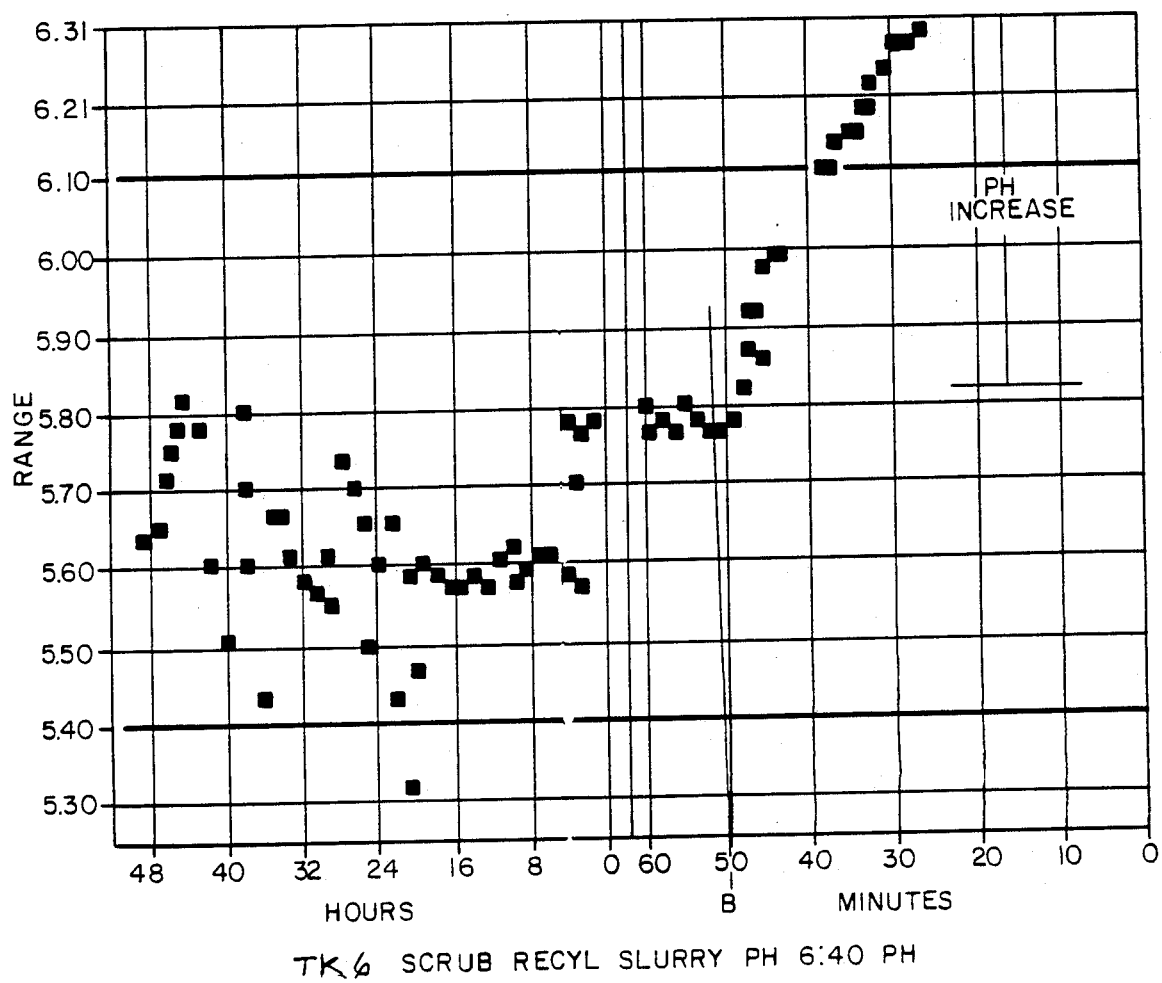
Figure 4:
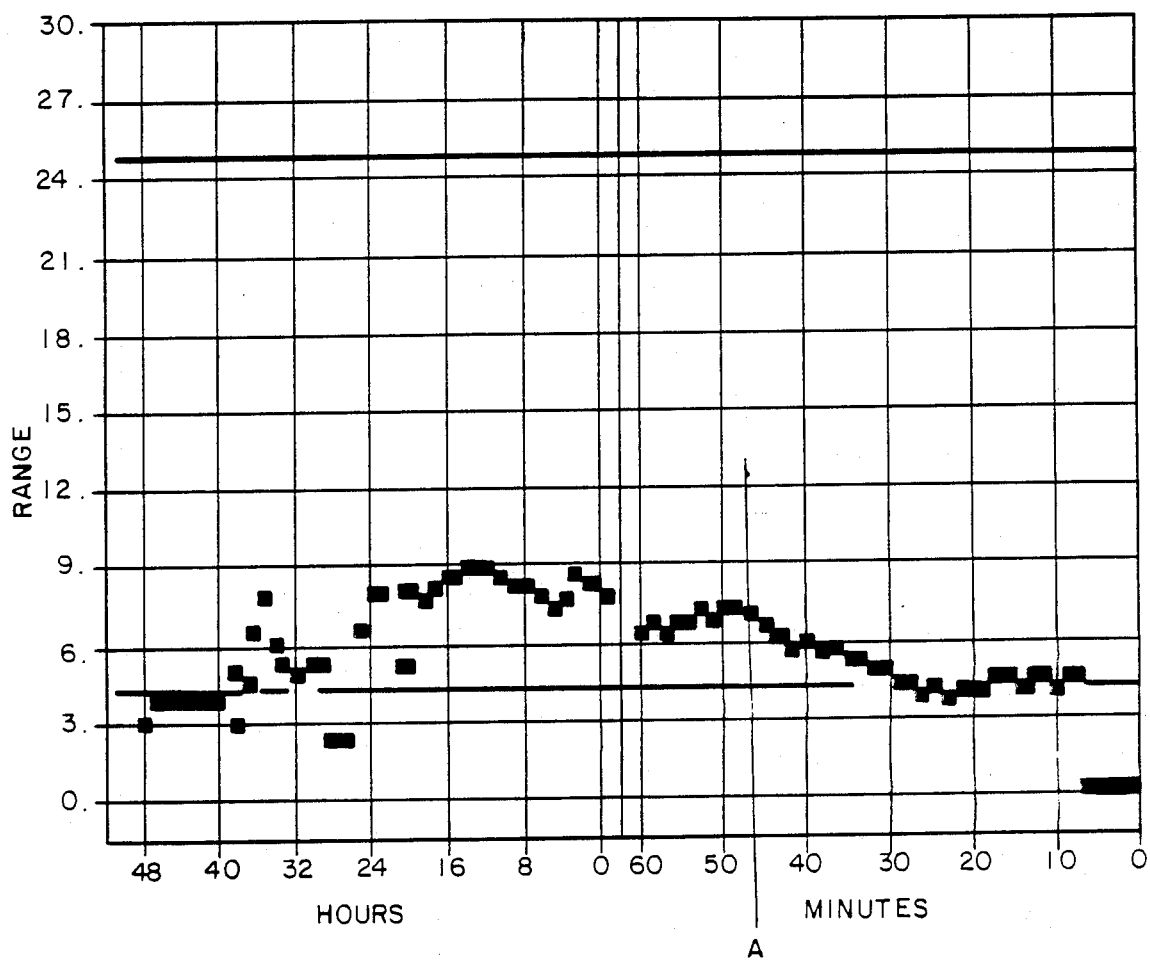

FIG. 1 depicts the change of pH with time.
FIG. 2 depicts the change of gallons per minute of lime feed with time.
FIG. 3 depicts the change of pH with time.
FIG. 4 depicts the change of gallons per minute of lime feed with time.

DISCUSSION

We have found that a number of carboxylic acids having a $pK_a$ greater than 2 but less than 7 can be utilized to enhance the alkalinity of fky ash for purposes of removing sulfur dioxide from flue gases. Stearic acid is effective for this purpose as are the acids evaluated in Table I.

These organic acids increase the availability of fly ash alkalinity, by interacting with, and removing, non-alkaline chemicals from the fly ash. Our studies have shown fly ash has a coating of alumina ($Al_2O_3$) and an underlying alkaline substrata. This alumina reacts with the carboxylic acid, making the underlying alkali available for sulfur dioxide removal. Thus, the acids of our invention act not as buffers, but reactive agents which through reaction enhance the available alkalinity of fly ash. However, these carboxylic acids generally provide a pH within the range of 6+ or −0.5 due to the increase in alkalinity released by the fly ash.

These acids may be blended with non-polar organic liquids. These liquids are adjuvants which enhance the dispersant qualities of the carboxylic acids.

Suitable non-polar organic liquids are the oils described in *The Condensed Chemical Dictionary*, p. 641, eighth edition, Van Nostrand Reinhold Company (1971). These oils are listed by type and junction, as follows:

I. Mineral
 1. Petroleum
  (a) Aliphatic or wax-base (Pennsylvania)
  (b) Aromatic or asphalt-base (California)
  (c) Mixed-base (Midcontinent)
 2. Petroleum-derived
  (a) Lubricants: engine oil, machine oil, cutting oil
  (b) Medicinal: refined paraffin oil
II Vegetable (chiefly from seeds or nuts)
 1. Drying (linseed, tung, oiticica)
 2. Semidrying (safflower, soybean)
 3. Nondrying (castor, cottonseed, coconut)
 4. Inedible soap stocks (palm, coconut)
III. Animal
 These usually occur as fats (tallow, lard, stearic acid.). The liquid types include fish oils, oleic acid, sperm oil, etc. They usually have a high fatty acid content.
IV. Essential
 Complex volatile liquids derived from flowers, stems and leaves, and often the entire plant. They contain terpenes (pinene, dipentene, etc.) and are used chiefly for perfumery and flavorings. Usually resinous products are admixed with them. Turpentine is a highly resinous essential oil.
V. Edible
 Edible oils include some vegetable oils, such a olive, cottonseed, corn and peanut, as well as some special fish oils (cod-lover, haliver, shark liver, etc.), used largely as medicines for their high vitamin content. Many edible oils are hydrogenated for use in cooking and industrial purposes.

Preferred non-polar organic liquids also include, kerosene, mineral oil, naphtha, and chlorinated solvents.

In certain instances, the oils, such as vegetable oil, utilized according to this invention may hydrolyze to provide a carboxylic acid suitable for use according to this invention as a fly ash alkalinity enhancer.

Where a non-polar organic liquid is utilized preferably the weight ratio of carboxylic acid to non-polar organic liquid will be within the range of 2:1 to 1:20 more preferably the ratio will be 1:1 to 1:15 and most preferably about 1:12.

Our studies have shown that the foam pH is the same as the slurry pH, and lime utilization remains low even after foam is killed. This data disproves the operators' theories concerning the underlying basis for the pH spikes caused by addition of antifoam.

As indicated in the introduction, many of the flue gas desulfurization scrubbing operations produce copious quantities of foam. It is, therefore, in certain instances, desirable to combine, with the composition used in the practice of this invention other defoaming agents and adjuvants which allow the composition to reduce the foaming problems in addition to their main purpose of improving extraction of alkaline materials from fly ash. Such adjuvants and additional defoaming ingredients are described in the Encyclopedia of Chemical Technology, Vol. 7, pages 444–448, John Wiley and Sons (Third Edition). Such adjuvants are, for example, silicones and certain alkoxylated materials.

Typical of a formulation that is within the scope of the invention and contains additional defoaming ingredients is Composition A.

Other suitable compositions similar to Composition A are disclosed in U.S. Pat. No. 2,668,150 which is hereby incorporated by reference.

Tests have been conducted with the stearic acid containing Composition A described below.

| Composition A | |
|---|---|
| Ingredient | Percent by Weight |
| Stearic Acid | 4.8 |
| Polypropylene Glycol (Mw 1,000–4,000) | 9.5 |
| Polyoxyethylene glycol dilaurate having A Mw of of approximately 4,000 (the dilaurate being approximately 44.4% polyethylene glycol; 55.49 tall oil, fatty acid, low rosin and 0.1 sulfuric acid 66 DEG BE) | 7.0 |
| Paraffin wax | 2.9 |
| Kerosene | 10.0 |
| Mineral oil | 61.8 |

During the study, it was found that certain weak carboxylic acids are effective fly ash alkalinity enhancers. Examples of these are provided in Table I.

TABLE I

| | 10% Fly Ash Slurry from | | | | | | | |
|---|---|---|---|---|---|---|---|---|
| | Fly Ash A (12.5% alkali) | | Fly Ash B (40% alkali) | | Fly Ash C (3% alkali) | | Fly Ash D (6% alkali) | |
| Acid | P | M | P | M | P | M | P | M |
| Blank | 2300 | 2350 | 930 | 970 | 86 | 120 | 0 | 8 |
| 0.05 g adipic | 1810 | 2050 | | | | | | |
| 0.05 g glutaric | 1600 | 1870 | | | | | | |
| 0.05 g 2,4-hexadienoic | 2210 | 2540 | | | | | | |
| 0.04 g propionic | 1850 | 2110 | | | | | | |
| 0.05 g tartronic | 2400 | 2470 | | | | | | |
| 0.05 g citric | 2600 | 2700 | | | | | | |
| 0.05 g octanoic | 2250 | 2500 | | | | | | |
| 0.05 g glycolic | 2350 | 2460 | | | | | | |
| 0.05 g Composition 'A' | 2350 | 2380 | 1000 | 1040 | 74 | 110 | 0 | 6 |
| 0.10 g Composition 'A' | 2400 | 2430 | | | | | | |
| 0.20 g Composition 'A' | 2390 | 2400 | | | | | | |
| 0.04 g Composition 'A' | 2380 | 2400 | | | | | | |
| 0.03 g stearic acid | 2600 | 2650 | 920* | 950* | 68 | 106 | 0 | 8 |

TABLE I-continued

| | 10% Fly Ash Slurry from | | | | | | | |
|---|---|---|---|---|---|---|---|---|
| | Fly Ash A (12.5% alkali) | | Fly Ash B (40% alkali) | | Fly Ash C (3% alkali) | | Fly Ash D (6% alkali) | |
| Acid | P | M | P | M | P | M | P | M |
| 0.15 g stearic acid | 2610 | 2650 | | | | | | |

Can't separate supernatant, slurry stabilized

EXAMPLE 1

In preparing Table I the following procedure was followed: Fly ash from four separate power producing plants was obtained. Ten percent aqueous fly ash slurries were prepared therefrom, each slurry having a total weight of 100 gms.

Each blank consisted of fly ash and water. For each fly ash type, a test was conducted utilizing an organic acid. The test consisted of adding the acid in the dosage indicated in the Table below. After addition of the acid, the sample was shaken and allowed to sit overnight. The supernatant was then poured off and both "P" and "M" alkalinities were determined for the supernatant.

Alkalinity increase is apparent from an increase of the total or "M" alkalinity and/or an increase of the difference between "P" and "M" alkalinity.

An increase of "M" alkalinity was observed with 2,4-hexadienoic anc citric acids. The increase of the difference between "P" and "M" alkalinity provides larger buffering capacity betweem pH 8.2 and 4.4, which is the typical pH range of scrubber slurry. The increase of the difference between "P" and "M" alkalinity is evident for all the above acids tested.

It appears that these acids are particularly good for fly ash containing higher amounts of CaO and MgO (see attached fly ash analysis).

Mineral analysis of fly ash A-D are disclosed in Tables II-V below.

A mineral analysis of fly ash A is provided in Table II below.

TABLE II

| Mineral Analysis of Fly Ash 'A' | % Weight Ignited Basis |
|---|---|
| Silica $SiO_2$ | 40.94 |
| Alumina, $Al_2O_3$ | 19.27 |
| Titania, $TiO_2$ | 0.76 |
| Ferric oxide, $Fe_2O_3$ | 5.21 |
| Lime, CaO | 14.53 |
| Magnesia, MgO | 3.55 |
| Potassium oxide, $K_2O$ | 0.91 |
| Sodium oxide, $Na_2O$ | 0.28 |
| Sulfur trioxie, $SO_3$ | 13.21 |
| Phosphorous pentoxide, $P_2O_5$ | 0.37 |
| Strontium Oxide, SrO | 0.16 |
| Barium Oxide, BaO | 0.67 |
| Manganese Oxide, $Mn_3O_4$ | 0.14 |
| Undetermined | 0.00 |
| | 100.00 |

A mineral analysis of Fly Ash B is provided in Table III below:

TABLE III

FLY ASH B
FIRESIDE DEPOSIT ANALYSIS

| Analysis of Dried Sample | | Inorganic Analysis of Ash (Weight Percent) | |
|---|---|---|---|
| Loss at 800C (%) | 0 | Ash | 99 |
| Unburned carbon (% C) | 0.2 | Calcium (CaO) | 31 |
| Carbonate (% $CO_2$) | 0 | Silicon ($SiO_2$) | 27 |
| Volatile sulfur ($SO_3$) | 0 | Aluminum ($Al_2O_3$) | 16 |

TABLE III-continued

FLY ASH B
FIRESIDE DEPOSIT ANALYSIS

| Analysis of Dried Sample | | Inorganic Analysis of Ash (Weight Percent) | |
|---|---|---|---|
| Balance ($H_2O$) | 0 | Magnesium (MgO) | 7 |
| | | Sulfur ($SO_3$) | 6 |
| | | Iron ($Fe_2O_3$) | 5 |
| pH of a 1% Slurry | 10.9 | Sodium ($Na_2O$) | 3 |
| | | Titanium ($TiO_2$) | 2 |
| | | Phosphorus ($P_2O_5$) | 1 |
| | | Barium (BaO) | 1 |

A mineral analysis of Fly Ash C is provided in Table IV below:

TABLE IV

FLY ASH C
FIRESIDE DEPOSIT ANALYSIS

| Analysis of Dried Sample | | Inorganic Analysis of Ash (Weight Percent) | |
|---|---|---|---|
| Loss at 800C (%) | 0 | Ash | 98 |
| Unburned carbon (% C) | 0.2 | Silicon ($SiO_2$) | 48 |
| Carbonate (% $CO_2$) | 0 | Aluminum ($Al_2O$) | 21 |
| Volatile sulfur ($SO_3$) | 0 | Iron ($Fe_2O_3$) | 20 |
| Balance ($H_2O$) | 0 | Calcium (CaO) | 2 |
| | | Phosphorus ($P_2O_5$) | 2 |
| | | Magnesium (MgO) | 1 |
| pH of a 1% Slurry | 9.4 | | 1 |
| | | | 1 |
| | | | 1 |

A mineral analysis of Fly Ash D is provided in Table V below:

TABLE V

FLY ASH D
FIRESIDE DEPOSIT ANALYSIS

| Analysis of Dried Sample | | Inorganic Analysis of Ash (Weight Percent) | |
|---|---|---|---|
| Loss at 800C (%) | 0 | Ash | 99 |
| Unburned carbon (% C) | 0.2 | Silicon ($SiO_2$) | 70 |
| Carbonate (% $CO_2$) | 0 | Aluminum ($Al_2O_3$) | 17 |
| Volatile sulfur ($SO_3$) | 0 | Calcium (CaO) | 4 |
| Balance ($H_2O$) | 0 | Magnesium (MgO) | 2 |
| | | Sodium ($Na_2O$) | 2 |
| | | Iron ($Fe_2O_3$) | 2 |
| pH of a 1% Slurry | 5.9 | Titanium ($TiO_2$) | 1 |
| | | Potassium ($K_2O$) | 1 |

The efficacy of the Table I acids as enhancers for $SO_2$ removal utilizing fly ash can generally be correlated to the $pK_a$ of the acids used. $pK_a$'s are provided in Table VI.

TABLE VI

| | $pK_a$ | | |
|---|---|---|---|
| Acid | $pK_1$ | $pK_2$ | $pK_3$ |
| Adipic | 4.26 | 5.03 | |
| Glutaric | 4.13 | 5.03 | |
| 2,4-hexadienoic | 4.77 | | |
| Itaconic | 3.68 | 5.14 | |
| Propionic | 4.88 | | |
| Citric | 2.87 | 4.35 | 5.69 |

TABLE VI-continued

| Acid | pK$_1$ | pK$_2$ | pK$_3$ |
|---|---|---|---|
| Octanoic | 4.89 | — | — |
| Glycolic | 3.63 | — | — |
| Phthalic | 2.75 | 4.93 | |
| Stearic | ~5 | | |
| Tartronic | 2.02 | 4.24 | |

EXAMPLE 2

A slurry was prepared as described in Example 1. The slurry was filtered through a 0.45 micron filter. The following analysis was preformed on the supernatant:

| | Without Composition A (ppm) | With Composition A, 0.05 g (ppm) |
|---|---|---|
| Al | 0.4 | 32 |
| Ca | 1200 | 1300 |
| Mg | 0 | 8.9 |

Significant increases (greater than 5 ppm) of aluminum, calcium, magnesium, iron and total sulfur were observed with the sample containing Composition A, in addition to an overall increase of component concentrations in the water phase.

This result showed that alumina, on the external surfaces of the fly ash, blocks the dissolution sites of the fly ash, thus preventing the dissolution of Ca, Mg and Fe oxides. With the addition of Composition A, surface alumina is dissolved in the water phase thus allowing the underlying alkalinity to be more readily solubilized. The significant increase of Mg ion in the supernatant indicates that Composition A greatly increases MgO dissolution.

EXAMPLE 3

A scrubber slurry sample containing lime and fly ash A was taken from an existing power plant during normal operations. The sample was placed in a jar. The jar was shaken and the pH taken. It was 5.61.

One drop of Composition A (30 ppm) was added to the sample. The sample was shaken again and the pH was then determined to be 6.13.

The above procedure was repeated and the same results were obtained.

EXAMPLE 4

Tests were conducted in the power plant from which the slurries for Example 3 were taken. Composition A was added to vessels containing SO$_2$ scrubber solution. The concentration of Composition A varied from 0.5 to 7.5 ppm. The results are described below and depicted in FIGS. 1 through 4.

FIG. 1

FIG. 1 depicts the change of pH with time for scrubber recycle slurry tank number 7. The left portion of the time axis is in hours and the right portion of the time axis is in minutes.

Time "O" represents the time at which test data plotting terminated. The data points are computer collected and analyzed, time averaged data points which were collected at an existing power plant. The right portion of the time axis is an exploded view of the time axis ending at time "O" and extending back in time.

As indicated in FIG. 1, generally the scrubber solution contained the power plant's normal concentration of lime and fly ash at a pH of 5.70. Upon the addition of Composition A, the pH increased to 6.25, and then declined to approximately 6.0 over the next hour with minimized need for additional lime.

FIG. 2

The same vessel was utilized for tests depicted in FIG. 1. The addition of Composition A, at time A, significantly reduced lime requirements for an hour.

FIG. 3

In FIG. 3 scrubber recycle slurry tank number 6 was used. The pH increased dramatically upon addition of Composition A, at time B, showing the release of normally bound alkalinity from the fly ash in the slurry.

FIG. 4

In the slurry test depicted in FIG. 4, Composition A was added at time A. Lime flow was turned off at or after the Composition A had been added to the system because no additional lime was needed.

Prior to these tests continuous feed of lime had been required to maintain proper alkalinity for effective flue gas desulfurization.

EXAMPLE 5

In viewing the results of Table I, it was determined that certain acids proved to be particularly effective because they were good dispersants. Tartronic acid is a case in point. For this reason, composition A was analyzed to determine the dispersancy of the component.

Dispersancy is important. Non-dispersible fly ash aglomerates form a solid mass in piping systems and slurry tanks which is difficult to remove. Fly ash which is dispersible however is not so intractable because even if it settles out in the system, it may easily be redispersed and flushed from the system.

It has been determined, that treatment with the carboxylic acids of this invention tends to increase the particle size of the fly ash, making the particle size distribution more uniform. Generally after treatment according to the method of this invention, fly ash particle falls within the range of 5 to 250 microns. The average particle size utilizing carboxylic acids of this invention may be brought within an average range of 75 to 150 microns. This adjustment to the particle size of the fly ash tends to enhance dispersability of the fly ash.

An analysis of the dispersablity of the components of Composition A is provided in Table VII below.

TABLE VII

| Dispersant | Composition A | 10% Fly Ash Slurry (Fly Ash A) After 3 Days |
|---|---|---|
| 1. Without Composition 'A' | | Nondispersible |
| 2. With Composition 'A' | 0.05 g | Nondispersible |
| | 0.10 g | Nondispersible |
| | 0.20 g | Dispersible |
| | 0.40 g | Dispersible |
| 3. Components | | |
| Kerosene | 0.19 g | Nondispersible |
| Mineral oil | 0.14 g | Nondispersible |
| Polypropylene glycol (Mw 4000) | 0.18 g | Nondispersible |
| Stearic acid | 0.08 g melted | Nondispersible |
| 4. Combinations | | |

TABLE VII-continued

| Dispersant | Composition A | 10% Fly Ash Slurry (Fly Ash A) After 3 Days |
|---|---|---|
| (a) Stearic acid Kerosene | 0.13 g & 3.47 g | Dispersible |
| (b) Stearic acid Kerosene | 0.46 g & 2.08 g | Dispersible |
| (c) Stearic acid Mineral oil | 0.30 g & 3.10 g | Dispersible |

5. Particle size analysis was done by Leeds & Northrup Microtrac. The result of particle size and scouring electromicroscopic analyses showed an increase of particle size at certain range, making the particle size distribution more uniform.

Having thus described our invention, we claim:

1. A method of enhancing the release of alkalinity from an aqueous suspension of finely divided fly ash which comprises contacting said suspension for a period of time sufficient to increase the alkalinity of the aqueous suspension with a mixture comprising (a) stearic acid and (b) a member selected from the group consisting of hydrocarbon mineral oil, polyalkylene glycol, alkylarylpolyether alcohol, and kerosene, wherein the amount of stearic acid added is from 0.5 to 500 ppm of the suspension and the weight ratio of stearic acid to the member of group (b) is in the range of 2:1 to 1:20.

2. A method of enhancing the release of alkalinity from an aqueous suspension of finely divided fly ash which comprises contacting said suspension for a period of time sufficient to increase the alkalinity of the aqueous suspension with a mixture comprising (a) stearic acid and (b) a non-polar organic liquid, wherein the amount of stearic acid added is from 0.5 to 500 ppm of the suspension and the weight ratio of stearic acid to non-polar liquid is in the range of 2:1 to 1:20.

3. The method of claim 2 wherein the ratio of carboxylic acid to non-polar organic liquid is about 1 to 12.

4. The method of claim 2 wherein the non-polar organic liquid is kerosene.

5. The method of claim 2 where the stearic acid is a dispersant.

6. The method of claim 2 wherein the non-polar organic liquid is a hydrocarbon mineral oil.

7. The method of claim 2 wherein the mixture further contains a polyalkylene glycol.

8. The method of claim 2 wherein the mixture further contains an alkylaryl polyester alcohol.

* * * * *